United States Patent
Park et al.

(10) Patent No.: US 9,462,577 B2
(45) Date of Patent: Oct. 4, 2016

(54) APPARATUS AND METHOD FOR CONFIGURING WIRELESS BACK HAUL LINK IN WIRELESS COMMUNICATION SYSTEM

(71) Applicant: Samsung Electronics Co., Ltd, Gyeonggi-do (KR)

(72) Inventors: Jeong-Ho Park, Seoul (KR); Tae-Young Kim, Gyeonggi-do (KR); Hyun-Kyu Yu, Gyeonggi-do (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 13/940,113

(22) Filed: Jul. 11, 2013

(65) Prior Publication Data

US 2014/0016584 A1 Jan. 16, 2014

(30) Foreign Application Priority Data

Jul. 11, 2012 (KR) ........................ 10-2012-0075330

(51) Int. Cl.
*H04W 76/02* (2009.01)
*H04W 72/04* (2009.01)
*H04W 24/02* (2009.01)
*H04W 84/04* (2009.01)
(Continued)

(52) U.S. Cl.
CPC ......... *H04W 72/0413* (2013.01); *H04W 24/02* (2013.01); *H04W 84/045* (2013.01); *H04W 92/12* (2013.01); *H04W 92/20* (2013.01)

(58) Field of Classification Search
CPC . H04W 8/26; H04W 24/02; H04W 72/0466; H04W 74/004; H04W 74/006; H04W 76/00; H04W 76/02; H04W 76/021; H04W 84/18; H04W 92/20
See application file for complete search history.

(56) References Cited

U.S. PATENT DOCUMENTS

| | | | |
|---|---|---|---|
| 2008/0254800 A1* | 10/2008 | Chun .................... | H04W 48/12 455/438 |
| 2009/0207761 A1 | 8/2009 | Tangemann et al. | |
| 2010/0075681 A1* | 3/2010 | Olofsson et al. ............. | 455/436 |

(Continued)

FOREIGN PATENT DOCUMENTS

| | | |
|---|---|---|
| EP | 2083595 | 7/2009 |
| WO | WO 2010/130268 A1 | 11/2010 |
| WO | WO 2012/042311 A1 | 4/2012 |

OTHER PUBLICATIONS

Written Opinion of the International Searching Authority dated Oct. 21, 2013 in connection with International Patent Application No. PCT/KR2013/005989.

(Continued)

*Primary Examiner* — Benjamin Lamont

(57) ABSTRACT

Provided is a method for configuring a wireless backhaul link by a Mobile Station (MS) in a wireless communication system. The method includes acquiring System Information (SI) for each of an old Base Station (BS) which transmits a first code and a new BS which transmits a second code. The method includes transmitting a message which reports the SI for the new BS to the old BS. The method includes receiving a message indicating that the new BS discards the second code and uses the first code from the old BS, wherein the first code is a code indicating that a related BS is a BS which has been already deployed, and wherein the second code is a code indicating that a related BS is a BS which is newly deployed.

33 Claims, 8 Drawing Sheets

(51) Int. Cl.
*H04W 92/12* (2009.01)
*H04W 92/20* (2009.01)

(56) References Cited

U.S. PATENT DOCUMENTS

| | | | |
|---|---|---|---|
| 2010/0178912 A1* | 7/2010 | Gunnarsson et al. | 455/423 |
| 2010/0291929 A1* | 11/2010 | Stephens et al. | 455/436 |
| 2010/0291934 A1* | 11/2010 | Lopes | 455/446 |
| 2011/0039558 A1* | 2/2011 | Lee et al. | 455/434 |
| 2011/0086652 A1* | 4/2011 | So et al. | 455/501 |
| 2011/0110347 A1* | 5/2011 | Mun | 370/338 |
| 2011/0294508 A1* | 12/2011 | Min et al. | 455/436 |
| 2012/0009957 A1* | 1/2012 | Murasawa | 455/507 |
| 2012/0014286 A1* | 1/2012 | Wang et al. | 370/254 |
| 2013/0163519 A1* | 6/2013 | Ribeiro et al. | 370/328 |
| 2015/0237568 A1* | 8/2015 | Park | H04W 48/16 370/338 |
| 2015/0245272 A1* | 8/2015 | Lindoff | H04W 48/06 370/332 |

OTHER PUBLICATIONS

International Search Report dated Oct. 21, 2013 in connection with International Patent Application No. PCT/KR2013/005989.

Farooq Khan, et al., "Millimeter-wave Mobile Broadband: Unleashing the 3-300GHz Spectrum", Mar. 28, 2011, Proc. Sarnoff Symposium, 117 pages.

Zhouyue Pi, et al., "An Introduction to Millimeter-Wave Mobile Broadband Systems", IEEE Communications Magazine, Jun. 2011, pp. 101-107.

Zhouyue Pi, et al., "System Design and Network Architecture for a Millimeter-wave Mobile Broadband (MMB) System", IEEE, Proc. Sarnoff Symposium, 2011, 6 pages.

Partial Supplementary European Search Report issued for EP 13816498.3 dated Mar. 9, 2016, 8 pgs.

Nokia Siemens Networks et al., "SON Use Case: Cell Phy_ID Automated Configuration", R3-80376, 3GPP TSG-RAN WG3 Meeting #59, Feb. 11, 2008, 3 pgs.

* cited by examiner

APPARATUS AND METHOD FOR CONFIGURING WIRELESS BACK HAUL LINK IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 11, 2012 and assigned Serial No. 10-2012-0075330, the entire disclosure of which is hereby incorporated by reference.

TECHNICAL FIELD

The present disclosure relates to an apparatus and method for configuring a wireless back haul link in a wireless communication system.

BACKGROUND

A wireless communication system has evolved to provide various high-speed large-capacity services to Mobile Stations (MSs). Examples of the wireless communication system include a High Speed Downlink Packet Access (HSDPA) mobile communication system, a High Speed Uplink Packet Access (HSUPA) mobile communication system, a Long-Term Evolution (LTE) mobile communication system, a LTE-Advanced (LTE-A) mobile communication system, a High Rate Packet Data (HRPD) mobile communication system proposed in a 3rd Generation Project Partnership 2 (3GPP2), and an Institute of Electrical and Electronics Engineers (IEEE) 802.16m mobile communication system.

That is, the wireless communication system has evolved to increase data rate for satisfying a data traffic need, so the wireless communication system actively considers using a super high frequency-ultra wideband scheme in which a super high frequency is used at an ultra wide band in order to increase the data rate. However, the super high frequency-ultra wideband scheme increases propagation loss, the propagation loss results in decreasing a propagation distance, so a service coverage of a Base Station (BS) is decreased.

Meanwhile, a beam forming scheme is a typical scheme in which the wireless communication system decreases propagation loss, so the wireless communication system uses the super high frequency-ultra wideband scheme and the beam forming scheme to increase a service coverage of a BS. Even if the wireless communication system uses the super high frequency-ultra wideband scheme and the beam forming scheme, data traffic increase in the wireless communication system results in an additional BS deployment. Recently, even if a service coverage is decreased according to the data traffic increase and system request, a need for a BS of which a size is small increases, so an additional BS deployment is resulted.

If a BS is additionally deployed in a wireless communication system, a link between a new BS and an old BS should be configured, a method for configuring the link between the new BS and the old BS in the wireless communication system will be described with reference to FIGS. 1 to 3.

FIG. 1 schematically illustrates a process for configuring a link between an old BS and a femto BS in a case that the femto BS is newly deployed as a new BS in a conventional wireless communication system.

Referring to FIG. 1, the wireless communication system includes an old BS 110 and a femto BS 120. If the femto BS 120 is newly deployed as a new BS in a situation in which the old BS 110 has been deployed in the wireless communication system, a Mobile Station (MS) may recognize that the femto BS 120 is newly deployed. After recomizing the newly deployed femto BS 120, the MS notifies the old BS 110 that the femto BS 120 is deployed, so the old BS 110 may recognize that the femto BS 120 is newly deployed.

FIG. 2 schematically illustrates a process for configuring a link between an old BS and a relay BS in a case that the relay BS is newly deployed as a new BS in a conventional wireless communication system.

Referring to FIG. 2, the wireless communication system includes an old BS 210 and a relay BS 220. If the relay BS 220 is newly deployed as a new BS in a situation in which the old BS 210 has been deployed in the wireless communication system, the relay BS 220 configures a link with the old BS 210 by performing an initial network entry procedure like an MS (not shown in FIG. 2).

FIG. 3 schematically illustrates a process for configuring a link between an old BS and a new BS in a case that the new BS is deployed in a conventional wireless communication system.

Referring to FIG. 3, the wireless communication system includes an old BS 310 and a new BS 320. If the new BS 320 is newly deployed in a situation in which the old BS 310 has been deployed, the wireless communication system configures a link between the old BS 310 and the new BS 320 by allocating a dedicated resource between the old BS 310 and the new BS 320. That is, the old BS 310 performs a signaling using a dedicated resource for configuring a back haul link between the old BS 310 and the new BS 320 as well as a signaling provided through an air link.

The link configuration method among BSs described in FIGS. 1 to 3 has following problems.

Firstly, in the link configuration method among BSs described in FIG. 1, if the femto BS 120 is newly deployed in a wireless communication system, there is a limitation in which the femto BS 120 should be connected to the old BS 110 through a wired back haul link.

Secondly, in the link configuration method among BSs described in FIG. 2, the relay BS 220 should be deployed within a service coverage of the old BS 210. So, a link coverage between the old BS 210 and the relay BS 220 may not exceed a link coverage between the old BS 210 and an MS.

Thirdly, in the link configuration method among BSs described in FIG. 3, a signaling should be always performed for configuring a back haul link among BSs using a dedicated resource, so severe waste for power, frequencies, etc. is resulted and a service quality is severely decreased.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, an aspect of the present invention is to provide an apparatus and method for configuring a wireless back haul link in a wireless communication system.

Another aspect of the present disclosure is to provide an apparatus and method for configuring a wireless back haul link in a reaction in which a wired back haul link may not be provided in a wireless communication system.

Another aspect of the present disclosure is to provide an apparatus and method for configuring a wireless back haul link without limiting link coverage among Base Stations (BSs) in a wireless communication system.

Another aspect of the present disclosure is to provide an apparatus and method for configuring a wireless back haul link using a dedicated resource as necessary in a wireless communication system.

In accordance with an aspect of the present disclosure, there is provided a method for configuring a wireless backhaul link by a Mobile Station (MS) in a wireless communication system, the method comprising: acquiring System Information (SI) for each of an old Base Station (BS) which transmits a first code and a new BS which transmits a second code; transmitting a message which reports the SI for the new BS to the old BS; and receiving a message indicating that the new BS discards the second code and uses the first code from the old BS, wherein the first code is a code indicating, that a related BS is a BS which has been already deployed, and wherein the second code is a code indicating that a related BS is a BS which is newly deployed.

In accordance with another aspect of the present disclosure, there is provided a method for configuring a wireless backhaul link by an old Base Station (BS) in a wireless communication system, the method comprising: receiving System Information (SI) for a new BS which transmits a second code from a Mobile Station (MS); performing a Front-Haul Link Configuration Procedure (FLCP) with the new BS; transmitting a first code to the new BS after completing the FLCP; and transmitting a message indicating that the new BS discards the second code and uses the first code, wherein the first code is a code indicating that a related BS is a BS which has been already deployed, and wherein the second code is a code indicating that a related BS is a BS which is newly deployed.

In accordance with another aspect of the present disclosure, there is provided a method for configuring a wireless backhaul link by a new Base Station (BS) in a wireless communication system, the method comprising: performing a Front-Haul Link Configuration Procedure (FLCP) with an old BS; after completing the FLCP with the old BS, receiving a first code from the old BS; and discarding a second code which the new BS has already used and using the first code, wherein the first code is a code indicating that a related BS is a BS which has been already deployed, and wherein the second code is a code indicating that a related BS is a BS which is newly deployed.

In accordance with another aspect of the present disclosure, there is provided a Mobile Station (MS) in a wireless communication system, the MS comprising: a transmitter; a receiver; and a controller, wherein the controller is configured to acquire System Information (SI) for each of an old Base Station (BS) which transmits a first code and a new BS which transmits a second code, wherein the transmitter is configured to transmit a message which reports the SI for the new BS to the old BS, wherein the receiver is configured to receive a message indicating that the new BS discards the second code and uses the first code from the old BS, wherein the first code is a code indicating that a related BS is a BS which has been already deployed, and wherein the second code is a code indicating that a related BS is a BS which is newly deployed.

In accordance with another aspect of the present disclosure, there is provided an old Base Station (BS) in a wireless communication system, the old BS comprising: a receiver; a transmitter; and a controller, wherein the receiver is configured to receive System Information (SI) for a new BS which transmits a second code from a Mobile Station (MS), wherein the controller is configured to perform a Front-Haul Link Configuration Procedure (FLCP) with the new BS, wherein the transmitter is configured to transmit a first code to the new BS after completing the FLCP, and transmits a message indicating, that the new BS discards the second code and uses the first code, wherein the first code is a code indicating that a related BS is a BS which has been already deployed, and wherein the second code is a code indicating that a related BS is a BS which is newly deployed.

In accordance with another aspect of the present disclosure, there is provided a new Base Station (BS) in a wireless communication system, the new BS comprising: a transmitter; a receiver; and a controller, wherein the controller is configured to perform a Front-Haul Link Configuration Procedure (FLCP) with an old BS, wherein the receiver is configured to receive a first code from the old BS after the FLCP with the old BS is completed, wherein the controller is configured to discard a second code which the new BS has already used and uses the first code, wherein the first code is a code indicating that a related BS is a BS which has been already deployed, and wherein the second code is a code indicating that a related BS is a BS which is newly deployed.

Other aspects, advantages, and salient features of the disclosure will become apparent to those skilled in the art from the following detailed description, which, taken in conjunction with the annexed drawings, discloses certain embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
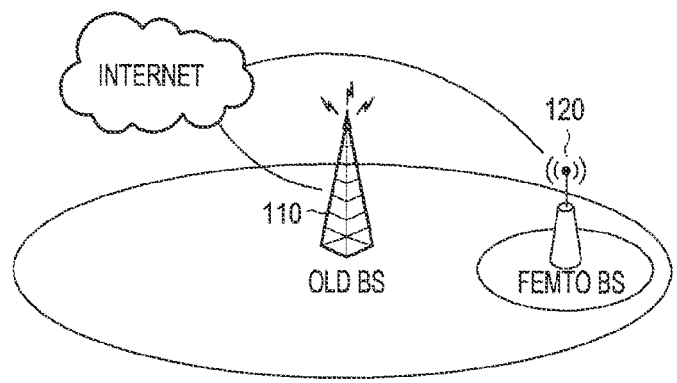
FIG. 1 schematically illustrates a process for configuring a link between an old BS and a femto BS in a case that the femto BS is newly deployed as a new BS in a conventional wireless communication system.
Figure 2:
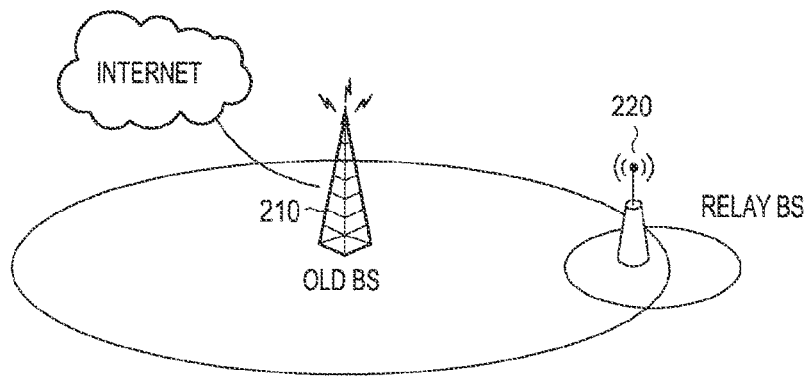
FIG. 2 schematically illustrates a process for configuring a link between an old BS and a relay BS in a case that the relay BS is newly deployed as a new BS in a conventional wireless communication system.
Figure 3:
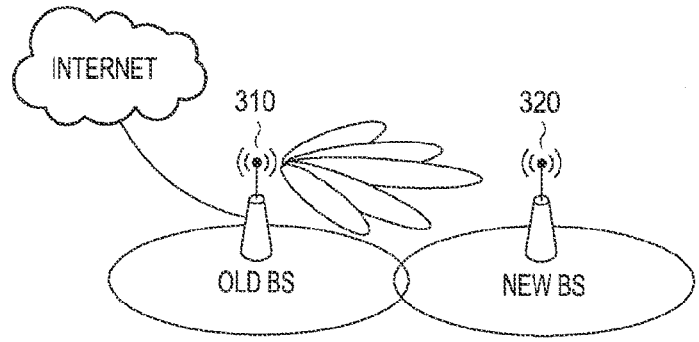
FIG. 3 schematically illustrates a process for configuring a link between an old BS and a new BS in a case that the new BS is deployed in a conventional wireless communication system.
Figure 4A:
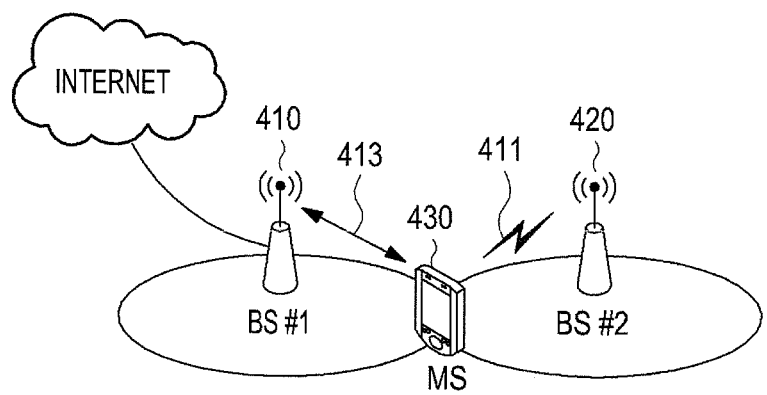
FIGS. 4A to 4D schematically illustrate a process for configuring a wireless back haul link between an old BS and a new BS in a case that the new BS is newly deployed in a wireless communication system according to embodiments of the present disclosure.
Figure 4B:
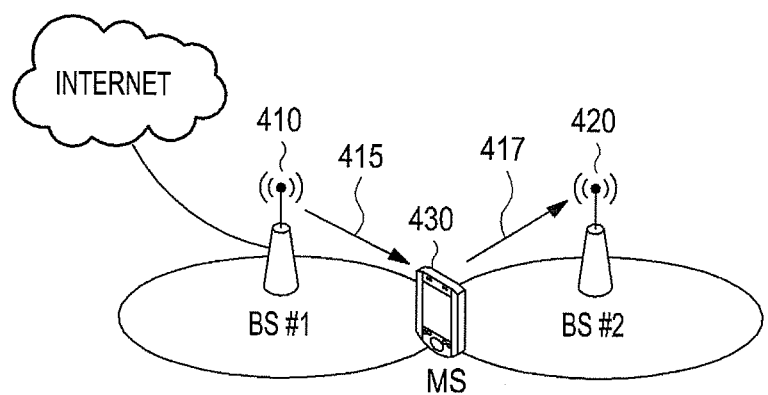
Figure 4C:
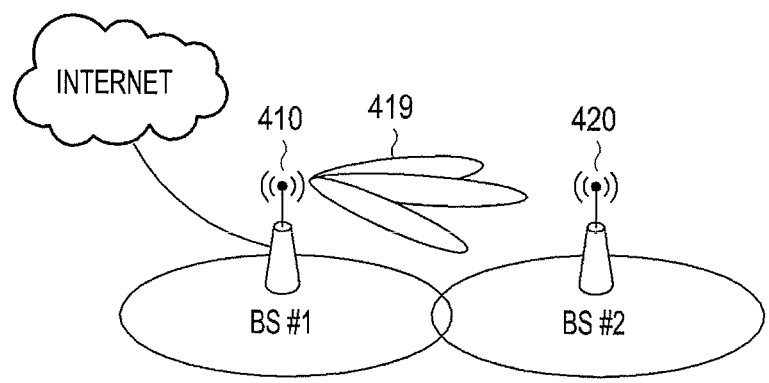
Figure 4D:
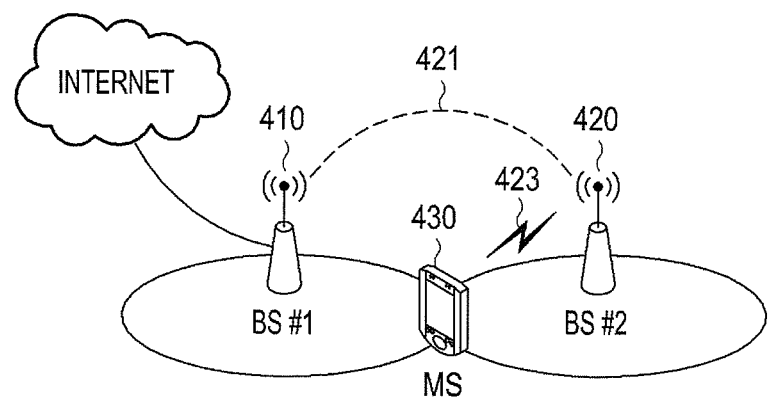

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged BS or MS.

The following description with reference to the accompanying drawings is provided to assist in a comprehensive understanding of certain embodiments of the disclosure as defined by the claims and their equivalents. It includes various specific details to assist in that understanding but these are to be regarded as examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments of the present disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

The present disclosure provides an apparatus and method for configuring a wireless back haul link in a wireless communication system.

The present disclosure provides an apparatus and method for configuring a wireless back haul link in a region in which a wired back haul link may not be provided in a wireless communication system.

The present disclosure provides an apparatus and method for configuring a wireless back haul link without limiting link coverage among Base Stations (BSs) in a wireless communication system.

The present disclosure provides an apparatus and method for configuring a wireless back haul link using a dedicated resource as necessary in a wireless communication system.

An apparatus and method for configuring a wireless back haul link provided in the present disclosure may be applied to various mobile communication systems such as a High Speed Downlink Packet Access (HSDPA) mobile communication system, a High Speed Uplink Packet Access (HSUPA) mobile communication system, a Long-Term Evolution (LTE) mobile communication system, a LTE-Advanced (LTE-A) mobile communication system, a High Rate Packet Data (HRPD) mobile communication system proposed in a 3rd Generation Project Partnership 2 (3GPP2), and an Institute of Electrical and Electronics Engineers (IEEE) 802.16m mobile communication system.

FIGS. 4A to 4D schematically illustrate a process for configuring a wireless back haul link between an old BS and a new BS in a case that the new BS is newly deployed in a wireless communication system according to embodiments of the present disclosure.

Referring to FIGS. 4A to 4D, the wireless communication system includes a BS #1 410, a BS #2 420, and a Mobile Station (MS) 430.

The MS 430 performs a scan operation for neighbor BSs. Upon detecting a preset Temporary code (Tcode), the MS 430 receives System Information (SI) from a BS which transmits the Tcode and stores the received SI (step 411). The Tcode is transmitted from only a newly deployed BS not a BS which has already benn deployed. The MS 430 does not perform a random access operation with the BS which transmits the Tcode.

For example, it will be assumed that the SI includes location associated information of a related BS, and the location associated information includes a latitude, a longitude, an altitude, etc. In FIGS. 4A to 4D, the BS #1 410 is an old BS, the BS #2 420 is a new BS that is newly deployed, and the MS 430 maintains a connection with the BS #1 410. The MS 430 transmits a new BS information report message including the SI received from the BS #2 420 to the BS #1 410 (step 413).

After receiving the new BS information report message from the MS 430, the BS #1 410 detects that there is the new BS using the Tcode around the BS #1 410, so the BS #1 410 should perform a Front-Haul Link Configuration Procedure (FLCP) with the new BS, e.g., the BS #2 420. The BS #1 410 starts the FLCP with the BS #2 420. The BS #1 410 transmits an FLCP start code transmission request message requesting to transmit an FLCP start request code indicating an FLCP start command to the BS #2 420 (step 415). The BS #1 410 may transmit the FLCP start code transmission request message to only the MS 430, and the number of MSs which transmit the FLCP start code transmission request message is determined without limitation according to a need of the BS #1 410. After receiving the FLCP start code transmission request message, the MS 430 transmits the FLCP start code to the BS #2 420 in order that the BS #2 420 starts performing the FLCP with the BS #1 410 (step 417).

Steps 415 to 417 may be omitted, and the BS #1 410 immediately starts performing the FLCP with the BS #2 420 if the steps 415 to 417 are omitted.

The BS #1 410 and the BS #2 420 perform an FLCP during a preset time at a preset timing point (step 419). The FLCP may include a procedure in which the BS #1 410 transmits a reference symbol for a front haul link to the BS #2 420 and receives the reference symbol from the BS #2 420.

After completing the FLCP, the BS #2 420 configures a wireless back haul with the BS #1 410, updates a system operating parameter used for an air link, discards a Tcode which the BS #2 420 has used, and uses a code for a normal air operation, i.e., a Normal code (Ncode) (step 421). If the BS #2 420 uses the Ncode, the MS 430 may perform a normal operation with the BS 2 #420 according to a need of the BS #2 420 (step 423).

Figure 5:
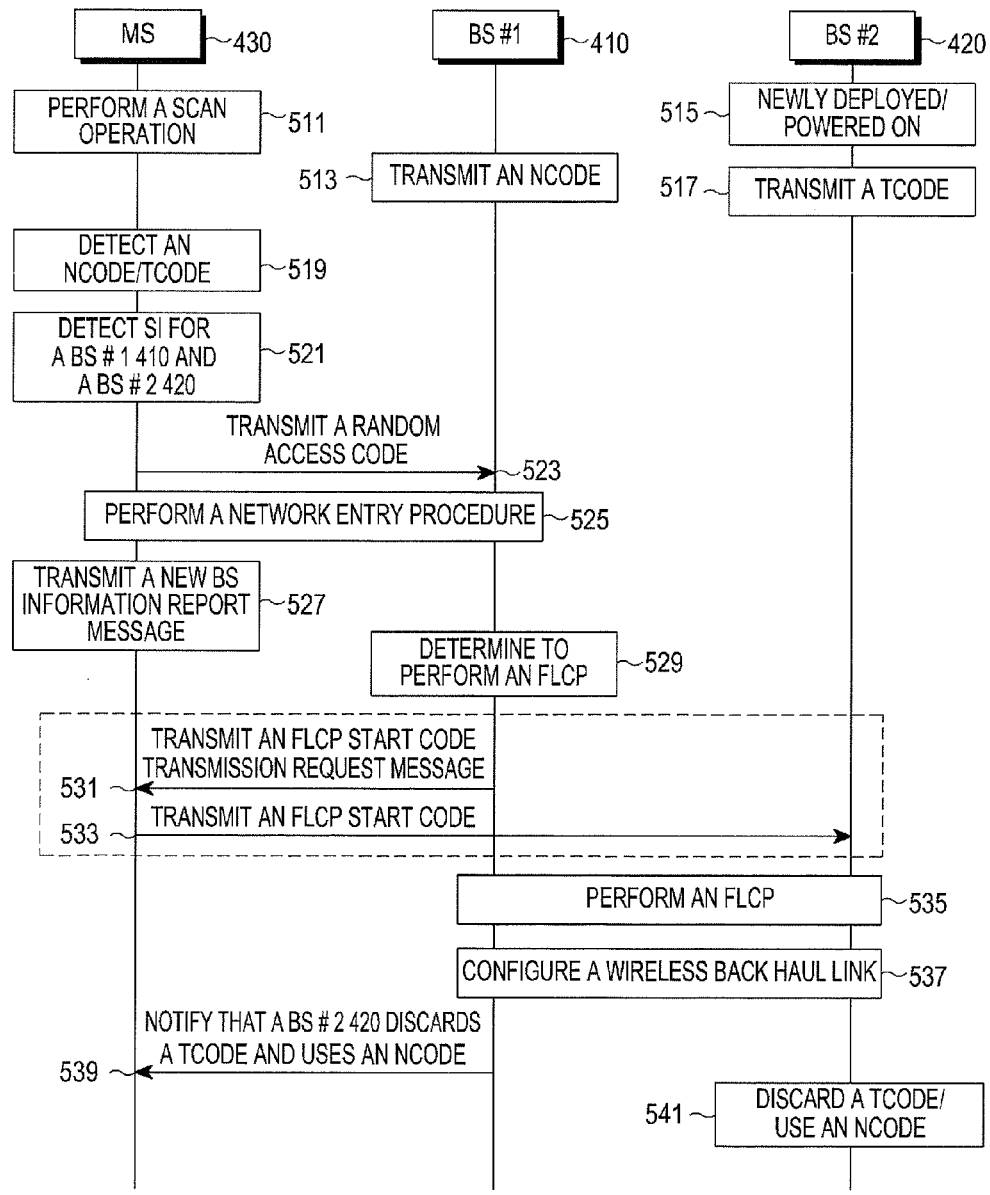
FIG. 5 schematically illustrates a process for configuring a wireless back haul link between an old BS and a new BS illustrated in FIGS. 4A to 4D.

FIG. 5 schematically illustrates a process for configuring a wireless back haul link between an old BS and a new BS illustrated in FIGS. 4A to 4D.

Referring to FIG. 5, a wireless communication system includes a BS #1 410, a BS #2 420, and an MS 430. The MS 430 performs a scan operation for neighbor BSs (step 511). The BS #1 410 transmits an Ncode (step 513). The BS #2 420 is newly deployed and powered on (step 515) and transmits a Tcode (step 517). The MS 430 detects an Ncode and a Tcode after performing the scan operation for the neighbor BSs (step 519) and SI for BSs which transmit the Ncode and the Tcode (step 521). The MS 430 detects SI for the BS #1 410 which transmits the Ncode and SI for the BS #2 420 which transmits the Tcode.

The MS 430 transmits a random access code to the BS #1 410 through a random access channel (RACH) (step 523), and performs a network entry procedure with the BS #1 410 (step 525). After performing the network entry procedure with the BS #1 410, the MS 430 transmits a new BS information report message to the BS #1 410 (step 527). In FIG. 5, after performing the network entry procedure, the MS 430 transmits the new BS information report message to the BS #1 410, however, it will be understood by those of ordinary skill in the art that the new BS information report message may be transmitted to the BS #1 410 during the network entry procedure.

After receiving the new BS information report message from the MS 430, the BS #1 410 detects that there is a new BS which is newly deployed around the BS #1 410, so the BS #1 410 determines to perform an FLCP with the new BS, i.e., the BS #2 420 (step 529). After determining to perform the FLCP with the BS #2 420, the BS #1 410 transmits an FLCP start code transmission request message to the MS 430 and MSs which are connected to the BS #1 410 (step 531). After receiving the FLCP start code transmission request message, the MS 430 transmits an FLCP start code to the BS #2 420 (step 533).

Steps 531 to 533 may be omitted, and the BS #1 410 immediately starts performing the FLCP with the BS #2 420 if the steps 531 to 533 are omitted.

The BS #1 410 and the BS #2 420 perform an FLCP during a preset time at a preset timing point (step 535). The FLCP may include a procedure in which the BS #1 410 transmits a reference symbol for a front haul link to the BS #2 420 and receives the reference symbol from the BS #2 420.

After the FLCP is completed, a wireless back haul link is configured between the BS #1 410 and the BS #2 420 (step 537). The BS #2 420 receives an Ncode from the BS #1 410 through the wireless back haul link. After the wireless back haul link is configured, the BS #1 410 notifies the MS 430 that a Tcode used in the BS #2 420 is discarded and an Ncode is used (step 539). After the wireless back haul link is configured, the BS #2 420 updates a system operating parameter used in an air link, discards the Tcode which the BS #2 420 has used, and uses a code for a normal air operation, i.e., an Ncode (step 541).

Figure 6:
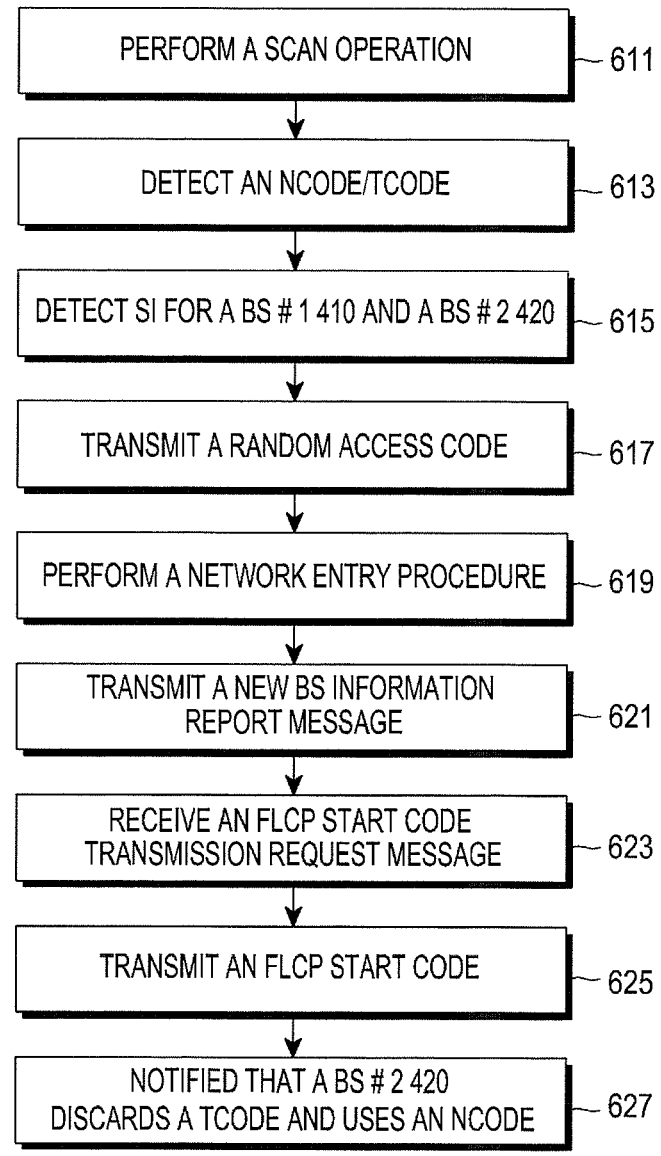
FIG. 6 schematically illustrates an operation process of an MS 430 illustrated in FIG. 5.

FIG. 6 schematically illustrates an operation process of an MS 430 illustrated in FIG. 5.

Referring to FIG. 6, the MS 430 performs a scan operation for neighbor BSs in step 611. The MS 430 detects an Ncode and a Tcode after performing the scan operation in step 613. The MS 430 detects SI for the BS #1 410 which transmits the Ncode and SI for the BS #2 420 which transmits the Tcode in step 615. The MS 430 transmits a random access code to the BS #1 410 through a RACH in step 617. The MS 430 performs a network entry procedure with the BS #1 410 in step 619.

The MS 430 transmits a new BS information report message to the BS #1 410 in step 621. The MS 430 receives an FLCP start code transmission request message from the BS #1 410 in step 623. The MS 430 transmits an FLCP start code to the BS #2 420 in step 625. The MS 430 is notified that the BS #2 420 discards the Tcode and uses the Ncode by the BS #1 410 in step 627.

Figure 7:
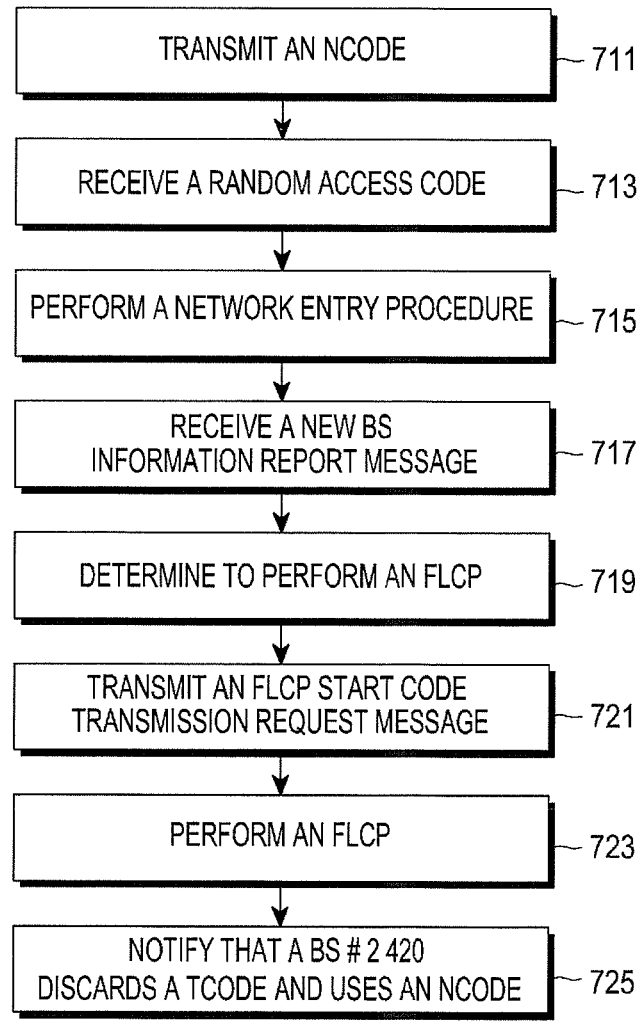
FIG. 7 schematically illustrates an operation process of a BS #1 410 illustrated in FIG. 5.

FIG. 7 schematically illustrates an operation process of a BS #1 410 illustrated in FIG. 5.

Referring to FIG. 7, the BS #1 410 transmits an Ncode in step 711 and receives a random access code from an MS 430 in step 713. The BS #1 410 performs a network entry procedure with the MS 430 in step 715. The BS #1 410 receives a new BS information report message from the MS 430 in step 717. The BS #1 410 determines to perform an FLCP with a BS #2 420 in step 719. The BS #1 410 transmits an FLCP start code transmission request message to the MS 430 and MSs which are connected to the BS #1 410 in step 721. The BS #1 410 performs an FLCP with the BS #2 420 during a preset time at a preset timing point in step 723. The BS #1 410 notifies the MS 430 that the Tcode used in the BS #2 420 is discarded and an Ncode is used to in step 725.

Figure 8:
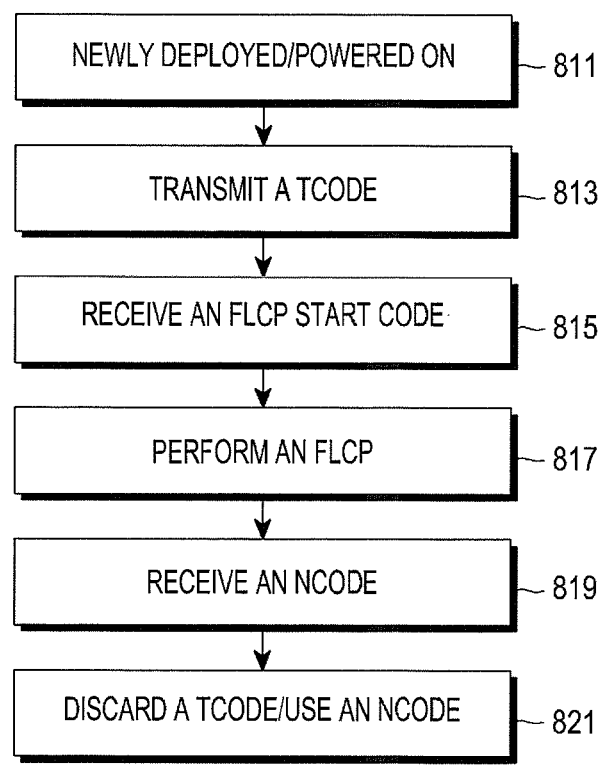
FIG. 8 schematically illustrates an operation process of a BS #2 420 illustrated in FIG. 5.

FIG. 8 schematically illustrates an operation process of a BS #2 420 illustrated in FIG. 5.

Referring to FIG. 8, the BS #2 420 is newly deployed and powered on in step 811 and transmits a Tcode in step 813. The BS #2 420 receives an FLCP start code from an MS 430 in step 815. The BS #2 420 performs an FLCP with a BS #1 410 in step 817. The BS #2 420 receives an Ncode from the BS #1 410 through a wireless back haul link in step 819. The BS #2 420 discards the Tcode and uses the Ncode in step 821.

Figure 9:
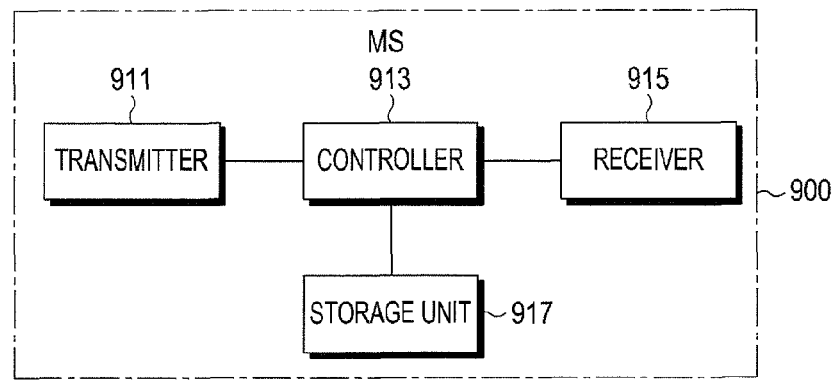
FIG. 9 schematically illustrates an internal structure of an MS in a wireless communication system according to embodiments of the present disclosure.

FIG. 9 schematically illustrates an internal structure of an MS in a wireless communication system according to embodiments of the present disclosure.

Referring to FIG. 9, an MS (900) includes a transmitter 911, a controller 913, a receiver 915, and a storage unit 917.

The controller 913 controls the overall operation of the MS 900. In particular, the controller 913 controls the MS 900 to perform an operation related to a wireless back haul link configuration operation between an old BS and a new BS. The operation related to the wireless back haul link configuration operation between the old BS and the new BS is performed in the manner described before with reference to FIGS. 4A to 6. The storage unit 917 stores a program and data related to the operation of the MS 900.

The transmitter 911 transmits signals and messages to the old BS and the new BS under a control of the controller 913. The transmitter 911 transmits the signals and the messages to the old BS and the new BS in the manner described before with reference to FIGS. 4A to 6.

The receiver 915 receives signals and messages from the old BS and the new BS under a control of the controller 913. The receiver 915 receives the signals and messages from the old BS and the new BS in the manner described before with reference to FIGS. 4A to 6.

The transmitter 911, the controller 913, the receiver 915, and the storage unit 917 are shown in FIG. 9 as separate units for convenience of description. In other words, two or more of the transmitter 911, the controller 913, the receiver 915, and the storage unit 917 may be incorporated into a single unit.

Figure 10:
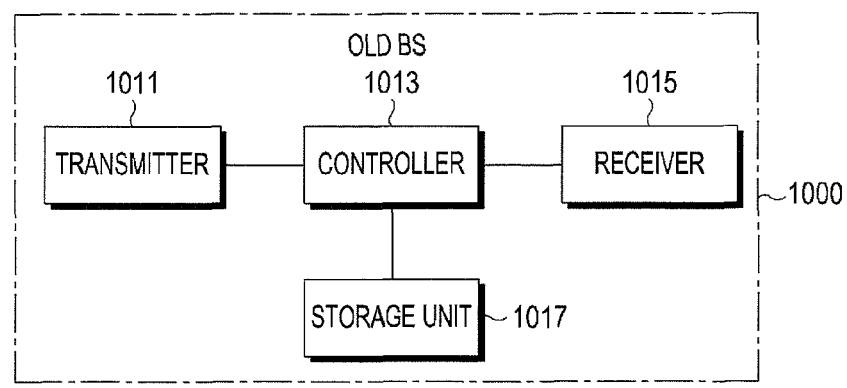
FIG. 10 schematically illustrates an internal structure of an old BS in a wireless communication system according to embodiments of the present disclosure.

FIG. 10 schematically illustrates an internal structure of an old BS in a wireless communication system according to embodiments of the present disclosure.

Referring to FIG. 10, an old BS (1000) includes a transmitter 1011, a controller 1013, a receiver 1015, and a storage unit 1017.

The controller 1013 controls the overall operation of the old BS 1000. In particular, the controller 1013 controls the old BS 1000 to perform an operation related to a wireless back haul link configuration operation between the old BS and a new BS. The operation related to the wireless back haul link configuration operation between the old BS and the new BS is performed in the manner described before with reference to FIGS. 4A to 4D, FIG. 5, and FIG. 7. The storage unit 1017 stores a program and data related to the operation of the old BS 1000.

The transmitter 1011 transmits signals and messages to an MS and the new BS under a control of the controller 1013. The transmitter 1011 transmits the signals and the messages to the MS and the new BS in the manner described before with reference to FIGS. 4A to 4D, FIG. 5, and FIG. 7.

The receiver 1015 receives signals and messages from the MS and the new BS under a control of the controller 1013. The receiver 1015 receives the signals and messages from the MS and the new BS in the manner described before with reference to FIGS. 4A to 4D, FIG. 5, and FIG. 7.

The transmitter 1011, the controller 1013, the receiver 1015, and the storage unit 1017 are shown in FIG. 10 as separate units for convenience of description. In other words, two or more of the transmitter 1011, the controller 1013, the receiver 1015, and the storage unit 1017 may be incorporated into a single unit.

Figure 11:
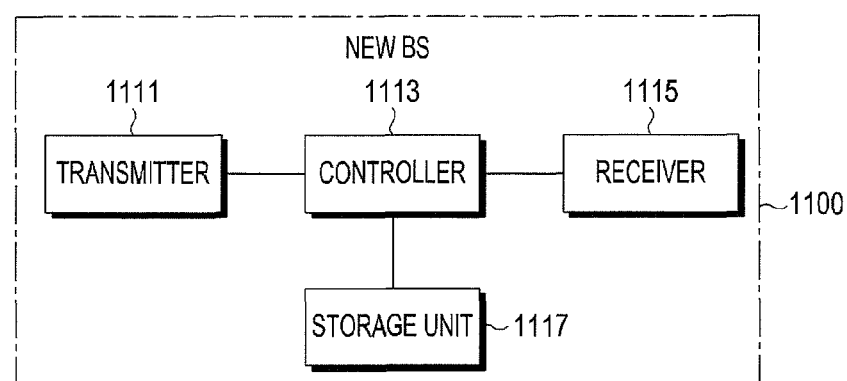
FIG. 11 schematically illustrates an internal structure of a new BS in a wireless communication system according to embodiments of the present disclosure.

FIG. 11 schematically illustrates an internal structure of a new BS in a wireless communication system according to embodiments of the present disclosure.

Referring to FIG. 11, a new BS (1100) includes a transmitter 1111, a controller 1113, a receiver 1115, and a storage unit 1117.

The controller 1113 controls the overall operation of the new BS 1100. In particular, the controller 1113 controls the new BS 1100 to perform an operation related to a wireless back haul link configuration operation between an old BS and the new BS. The operation related to the wireless back haul link configuration operation between the old BS and the new BS is performed in the manner described before with reference to FIGS. 4A to 4D, FIG. 5, and FIG. 8. The storage unit 1117 stores a program and data related to the operation of the new BS 1100.

The transmitter 1111 transmits signals and messages to an MS and the old BS under a control of the controller 1113. The transmitter 1111 transmits the signals and the messages to the MS and the old BS in the manner described before with reference to FIGS. 4A to 4D, FIG. 5, and FIG. 8.

The receiver 1115 receives signals and messages from the MS and the old BS under a control of the controller 1113. The receiver 1115 receives the signals and messages from the MS and the old BS in the manner described before with reference to FIGS. 4A to 4D, FIG. 5, and FIG. 8.

The transmitter 1111, the controller 1113, the receiver 1115, and the storage unit 1117 are shown in FIG. 11 as separate units for convenience of description. In other words, two or more of the transmitter 1111, the controller 1113, the receiver 1115, and the storage unit 1117 may be incorporated into a single unit.

As is apparent from the foregoing description, the present disclosure enables to automatically configure a wireless back haul link between an old BS and a new BS in a wireless communication system.

The present disclosure enables to configure a wireless back haul link between an old BS and a new BS in a region in which a wired back haul link may not be provided in a wireless communication system.

The present disclosure enables to configure a wireless back haul link between an old BS and a new BS without limiting link coverage among Base Stations (BSs) in a wireless communication system.

The present disclosure enables to configure a wireless back haul link between an old BS and a new BS using a dedicated resource as necessary in a wireless communication system.

Although the present disclosure has been described with certain embodiments, various changes and modifications may be suggested to one skilled in the art. It is intended that the present disclosure encompass such changes and modifications as fall within the scope of the appended claims.

What is claimed is:

1. An operating method of a mobile station (MS) in a wireless communication system, the operating method comprising:
   receiving system information (SI) for each of a first base station (BS) which transmits a first code and a second BS which transmits a second code; and
   transmitting, to the first BS, a message including the SI for the second BS,
   wherein the first code indicates that the first BS is deployed with backhaul link, and
   wherein the second code indicates that the second BS is not deployed with backhaul link.

2. The operating method of claim 1, further comprising:
   receiving, from the first BS, a message which requests the MS to transmit a third code to the second BS; and
   transmitting, to the second BS, the third code,
   wherein the third code indicates that the second BS is requested to perform a front-haul link configuration procedure (FLCP) with the first BS.

3. The operating method of claim 1, further comprising:
   detecting the first code and the second code by performing a scan operation for neighbor BSs.

4. The operating method of claim 1, further comprising:
   performing a network entry procedure with the first BS.

5. The operating method of claim 1, wherein SI includes location associated information of a BS.

6. The operating method of claim 1, wherein the first code is a temporary code (Tcode), and the second code is a normal code (Ncode).

7. An operating method of a first base station (BS) in a wireless communication system, the operating method comprising:

receiving, from a mobile station (MS), system information (SI) for a second BS which transmits a second code;
performing a front-haul link configuration procedure (FLCP) with the second BS; and
transmitting, to the second BS, a first code after completing the FLCP,
wherein the first code indicates that the first BS is deployed with backhaul link, and
wherein the second code indicates that the second BS is not deployed with backhaul link.

8. The operating method of claim 7, further comprising:
transmitting, to the MS, a message which requests the MS to transmit a third code to the second BS,
wherein the third code indicates that the second BS is requested to perform the FLCP with the first BS.

9. The operating method of claim 7, further comprising:
transmitting, to the MS, the first code.

10. The operating method of claim 7, further comprising:
performing a network entry procedure with the MS.

11. The operating method of claim 7, wherein SI includes location associated information of a BS.

12. The operating method of claim 7, wherein the first code is a temporary code (Tcode), and the second code is a normal code (Ncode).

13. An operating method of a second base station (BS) in a wireless communication system, the operating method comprising:
transmitting a second code;
performing a front-haul link configuration procedure (FLCP) with a first BS; and
after completing the FLCP with the first BS, receiving, from the first BS, a first code,
wherein the first code indicates that the first BS is deployed with backhaul link, and
wherein the second code indicates that the second BS is not deployed with backhaul link.

14. The operating method of claim 13, further comprising:
receiving, from the MS, a message which requests the second BS to transmit a third code to the first BS,
wherein the third code indicates that the second BS is requested to perform the FLCP with the first BS.

15. The operating method of claim 13, wherein SI includes location associated information of a BS.

16. The operating method of claim 13, wherein the first code is a temporary code (Tcode), and the second code is a normal code (Ncode).

17. A mobile station (MS) in a wireless communication system, the MS comprising:
a transceiver; and
a controller,
wherein the controller is configured to receive system information (SI) for each of a first base station (BS) which transmits a first code and a second BS which transmits a second code,
wherein the transceiver is configured to transmit, to the first BS, a message including the SI for the second BS,
wherein the first code indicates that the first BS is deployed with backhaul link, and
wherein the second code indicates that the second BS is not deployed with backhaul link.

18. The MS of claim 17, wherein the transceiver is configured to receive, from the first BS, a message which requests the MS to transmit, to the second BS, a third code, and to transmit, to the first BS, the third code, and wherein the third code indicates that the second BS is requested to perform a front-haul link configuration procedure (FLCP) with the first BS.

19. The MS of claim 17, wherein the controller is configured to detect the first code and the second code by performing a scan operation for neighbor BSs.

20. The MS of claim 17, wherein the controller is configured to perform a network entry procedure with the first BS.

21. The MS of claim 17, wherein SI includes location associated information of a BS.

22. The MS of claim 17, wherein the first code is a temporary code (Tcode), and the second code is a normal code (Ncode).

23. A first base station (BS) in a wireless communication system, the first BS comprising:
a transceiver; and
a controller,
wherein the transceiver is configured to receive, from a mobile station (MS), system information (SI) for a second BS which transmits a second code,
wherein the controller is configured to perform a front-haul link configuration procedure (FLCP) with the second BS,
wherein the transceiver is configured to transmit, to the second BS, a first code after completing the FLCP,
wherein the first code indicates that the first BS is deployed with backhaul link, and
wherein the second code indicates that the second BS is not deployed with backhaul link.

24. The first BS of claim 23, wherein the transceiver is configured to transmit, to the MS, a message which requests the MS to transmit, to the second BS, a third code, and
wherein the third code indicates that the second BS is requested to perform the FLCP with the first BS.

25. The first BS of claim 23, wherein the transceiver transmits, to the MS, the first code.

26. The first BS of claim 23, wherein the controller performs a network entry procedure with the MS.

27. The first BS of claim 23, wherein SI includes location associated information of a BS.

28. The first BS of claim 23, wherein the first code is a temporary code (Tcode), and the second code is a normal code (Ncode).

29. A second base station (BS) in a wireless communication system, the second BS comprising:
a transceiver; and
a controller,
wherein the transceiver is configured to transmit a second code,
wherein the controller is configured to perform a front-haul link configuration procedure (FLCP) with a first BS,
wherein the transceiver is configured to receive, from the first BS, a first code after the FLCP with the first BS is completed,
wherein the first code indicates that the first BS is deployed with backhaul link, and
wherein the second code indicates that the second BS is not deployed with backhaul link.

30. The second BS of claim 29, wherein the transceiver is configured to receive, from the MS, a message which requests the second BS to transmit, to the first BS, a third code, and
wherein the third code indicates that the second BS is requested to perform the FLCP with the first BS.

31. The second BS of claim 29, wherein the transceiver is configured to transmit, to the MS, the second code.

32. The second BS of claim 29, wherein SI includes location associated information of a BS.

33. The second BS of claim 29, wherein the first code is a temporary code (Tcode), and the second code is a normal code (Ncode).

* * * * *